United States Patent [19]
Fishburn

[11] Patent Number: 6,155,759
[45] Date of Patent: Dec. 5, 2000

[54] APPARATUS FOR MILLING THE SURFACE OF A LOW SLOPE SUBSTRATE

[76] Inventor: Douglas C. Fishburn, Steeles Avenue, Hornby, Ontario, Canada, L0P 1E0

[21] Appl. No.: 09/203,374

[22] Filed: Dec. 2, 1998

[51] Int. Cl.[7] ........................................................ B23C 1/20
[52] U.S. Cl. .............................................. 409/211; 83/869
[58] Field of Search ................................... 409/190, 191, 409/201, 211; 83/471.3, 472, 473, 477, 477.1, 481, 743, 745, 788, 795, 796, 797, 798, 869, 871, 875

[56] References Cited

U.S. PATENT DOCUMENTS

| | | |
|---|---|---|
| 2,620,835 | 12/1952 | Barnhart . |
| 2,735,455 | 2/1956 | Forsberg . |
| 3,866,496 | 2/1975 | Payne et al. . |
| 4,235,140 | 11/1980 | Reece . |
| 4,584,918 | 4/1986 | Stubbe et al. ........................ 83/471.3 |
| 4,947,910 | 8/1990 | Reneau . |
| 5,046,391 | 9/1991 | Lewis et al. .......................... 83/471.3 |
| 5,303,755 | 4/1994 | Poling .................................. 83/471.3 |
| 5,404,779 | 4/1995 | Break ................................... 83/471.3 |
| 5,509,338 | 4/1996 | Ekker . |

Primary Examiner—M. Rachuba
Assistant Examiner—Melissa Hall
Attorney, Agent, or Firm—Ridout & Maybee

[57] ABSTRACT

An apparatus for milling the surface of low slope substrate has a milling device, such as a saw, and a track along which the milling device may move. The track is supported above the substrate by a plurality of adjustable supports which have adjustment means for orienting the track vertically or at a desired angle to horizontal. A mounting assembly for the milling device has means for engaging the track and enabling movement of the assembly along the track with the milling device depending from the mounting assembly. Adjustment means coact with the milling device and the mounting assembly enabling the device to be oriented in a desired manner relative to the substrate.

12 Claims, 3 Drawing Sheets

APPARATUS FOR MILLING THE SURFACE OF A LOW SLOPE SUBSTRATE

The invention is an apparatus for milling the surface of essentially low slope substrate. The invention is particularly useful for levelling a rigid insulation material applied to a roof during the process of roof construction.

Low slope roofs for buildings are typically comprised of a deck, vapour retarder, a layer of insulation, or insulating fill, a waterproof membrane and an exterior finish material. In order to avoid the ponding of water on the finished roof, the roof deck or insulation material is typically sloped to provide positive drainage. Due to design or construction designs, positive slope or drainage is not often achieved.

SUMMARY OF THE INVENTION

The present invention provides an apparatus for use on a roof which incorporates an insulation material. The invention allows workmen to shave the insulating layer to remove high spots, or create slopes, valleys or sumps, in order to achieve positive slope for drainage. The invention allows the roofer to slope the plane of the insulating material for drainage, and the apparatus can be employed to cut drainage troughs in the insulation layer.

Accordingly, the invention provides an apparatus for milling the surface of low slope substrate, which comprises a milling device and a track along which the milling device may move. The track is supported above the substrate by a plurality of adjustable supports which have adjustment means for orienting the track horizontally or at a desired angle to horizontal. A mounting assembly for the milling device has means for engaging the track and enabling movement of the assembly along the track with the milling device independent from the mounting assembly. Adjustment means coact with the milling device and the mounting assembly enabling the device to be oriented in a desired manner relative to the substrate.

DETAILED DESCRIPTION OF THE PREFERRED EMBODIMENT

The invention will be described in relation to its use as an apparatus for levelling an insulating material installed on a roof or other structure or for the purpose of levelling on pending slope. The apparatus can be used in new or retrofit construction type projects as to either level or slope a surface.

Figure 1:
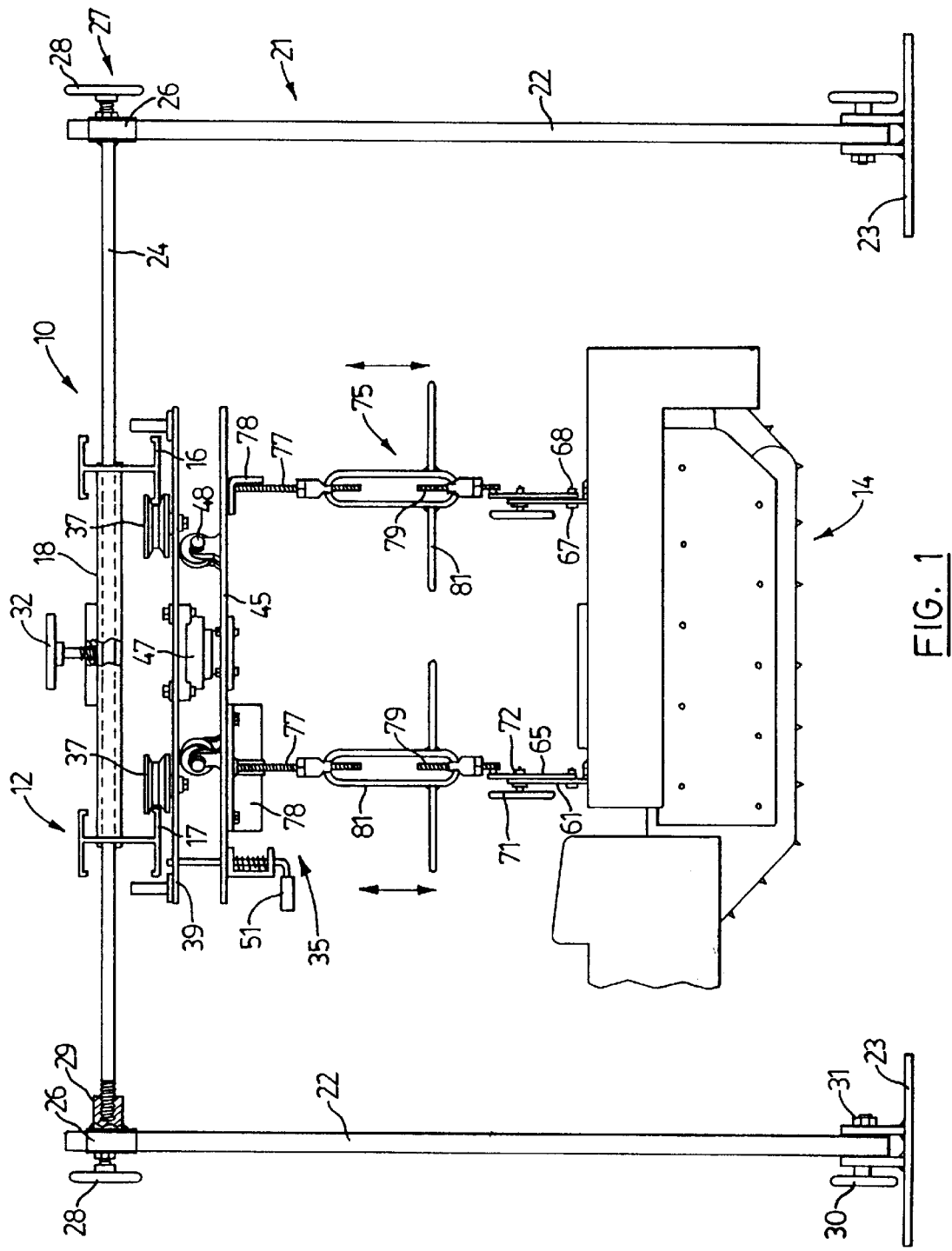
FIG. 1 (see detail) is a front elevation of the apparatus of the invention.
Figure 2:
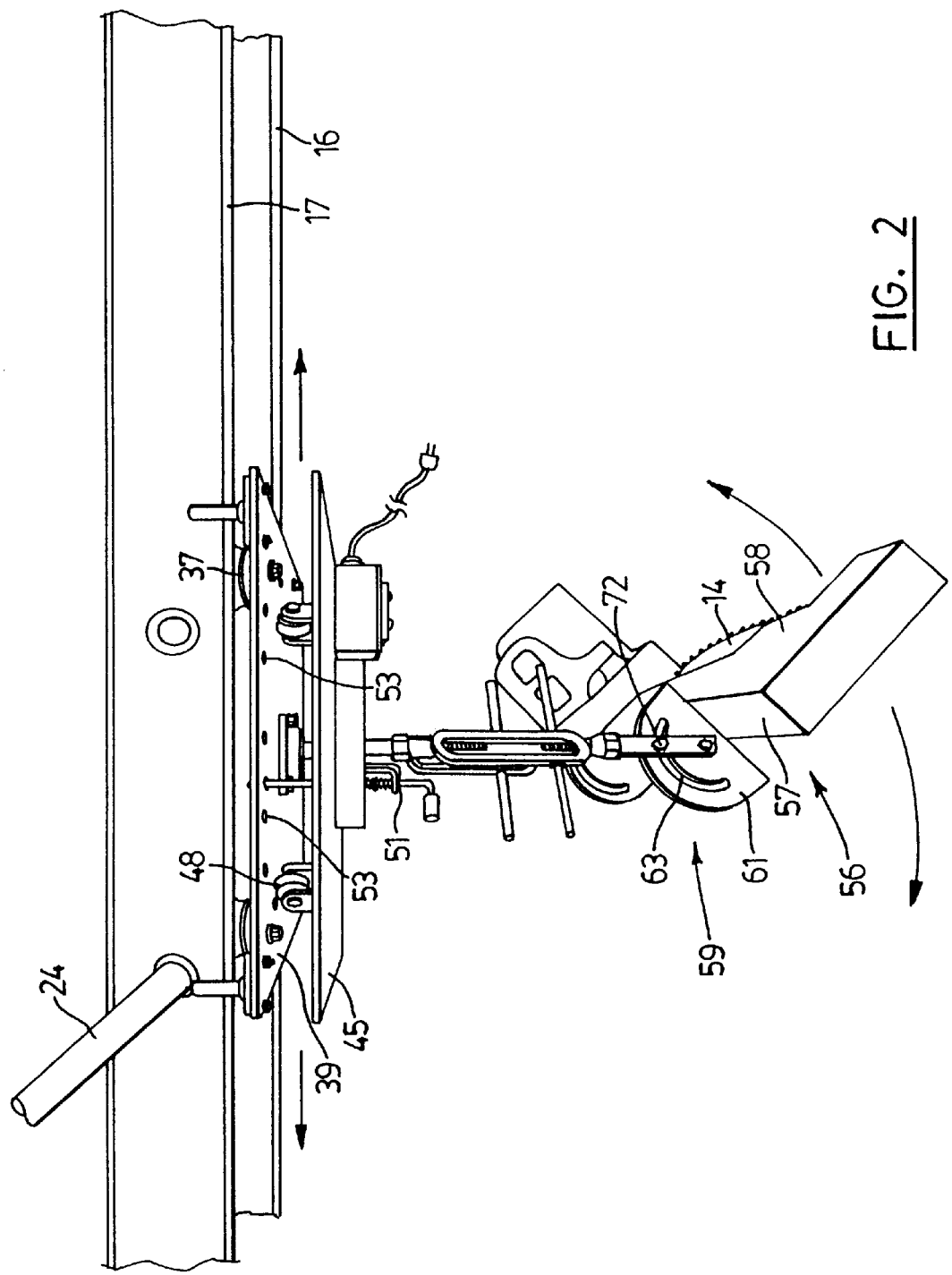
FIG. 2 is a side elevation detail view showing the operation of the pitch angle adjustment means.
Figure 3:
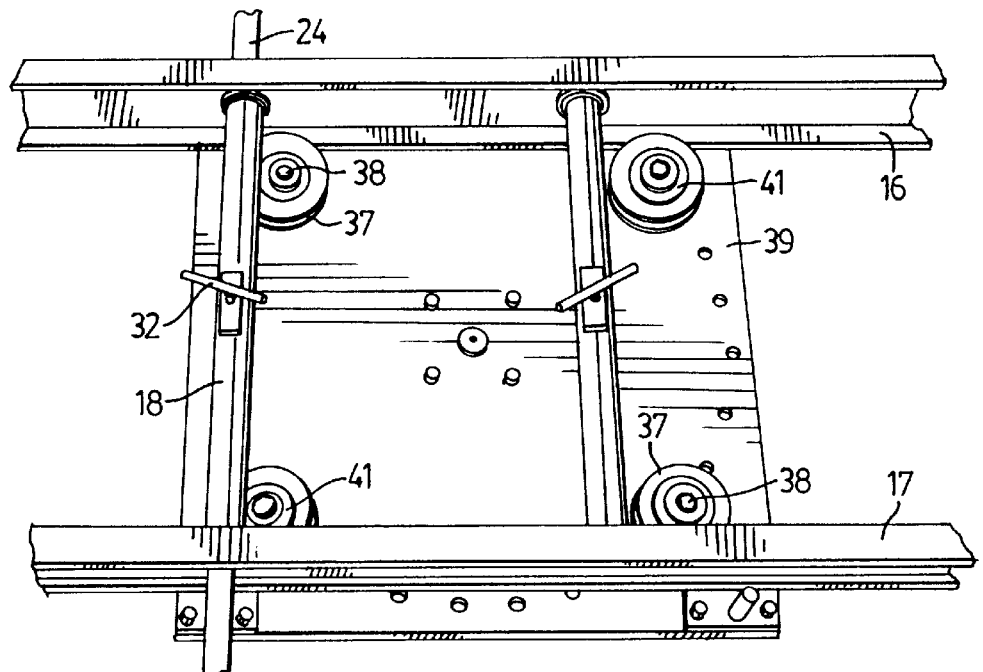
FIG. 3 is a top plan detail view of the track and top plate of the mounting assembly of the apparatus.

As shown in FIGS. 1–3, the apparatus 10 comprises a track, such as a ladder 12 along which a milling device such as a saw 14 may move. The track 12 with two parallel rails 16 and 17 along which are spaced a plurality of rungs 18, which preferably are tubes extending through the rails 16 and 17. The track 12 total assembly is supported above the substrate roof insulation by means of a plurality of adjustable support structures 21, which comprise upright members 22, each being supported by a base 23, and a cross member 24 which is sized to extend through a tubular rung 18 of the track 12 and be slidably height adjustable along the upright members 22. A preferred adjustment means for the cross member 24 are sleeves 26 attached at each end of the cross member 24. The sleeves 26 are sized to slide along the upright members 22, and each sleeve 26 is equipped with a locking means 27 for securing the sleeve 26 in place along the upright 22. A preferred locking means is a toggle bolt 28 threaded through the sleeve 26 for engaging the upright member 22 to frictionally secure the sleeve 26 in place. Using this arrangement, at least one end of the cross member 24 is threaded for attachment to a sleeve 26 having a threaded pipe section 29 affixed to it for receiving the threaded end of the cross member 24. The other end of the member 24 may be permanently affixed to a sleeve 26, for example, by welding. Preferably, the upright member 22 is hinged to the base 23 and is securable at an angle to the base 23 by means of a bolt 30 and nut 31. This hinged relationship allows the base 23 to be oriented along the slope of a roof surface with the upright member 22 vertical. The machine has two adjustments for height. The track 12 itself can be angled on the upright members 22 and the toggle bolts 28 can be shortened or lengthened, thereby levelling the slope. Fine adjustment is provided by a turnbuckle 75 holding the by saw 14.

A preferred method for facilitating the assembly of the track 12 and support structures 21 is as follows. The cross members 24 are disassembled from the upright members 22, and a sleeve 26 is unscrewed from one end. The free ends of the cross members 24 are passed through rungs 18 and then reattached to the threaded pipe sections 29 of the sleeves 26. The cross members 24 are spaced along the track 12 sufficiently close to one another to provide adequate support and stability to the apparatus 10 as fully assembled. Typically, the cross members 24 are spaced 3 to 5 feet apart. Each rung 18 has a bolt 32 threaded through it for engaging and securing the cross member 24 to the rung 18. The track 12 having the cross members 24 extending through rungs 18 is then suspended above the roof insulation by affixing each cross member 24 to a pair of upright members 22. The slope angle of the track 12 can be set at this stage of the assembly of the apparatus 10, but it is preferred in most cases to delay such adjustment until the entire apparatus 10 is assembled.

Figure 4:
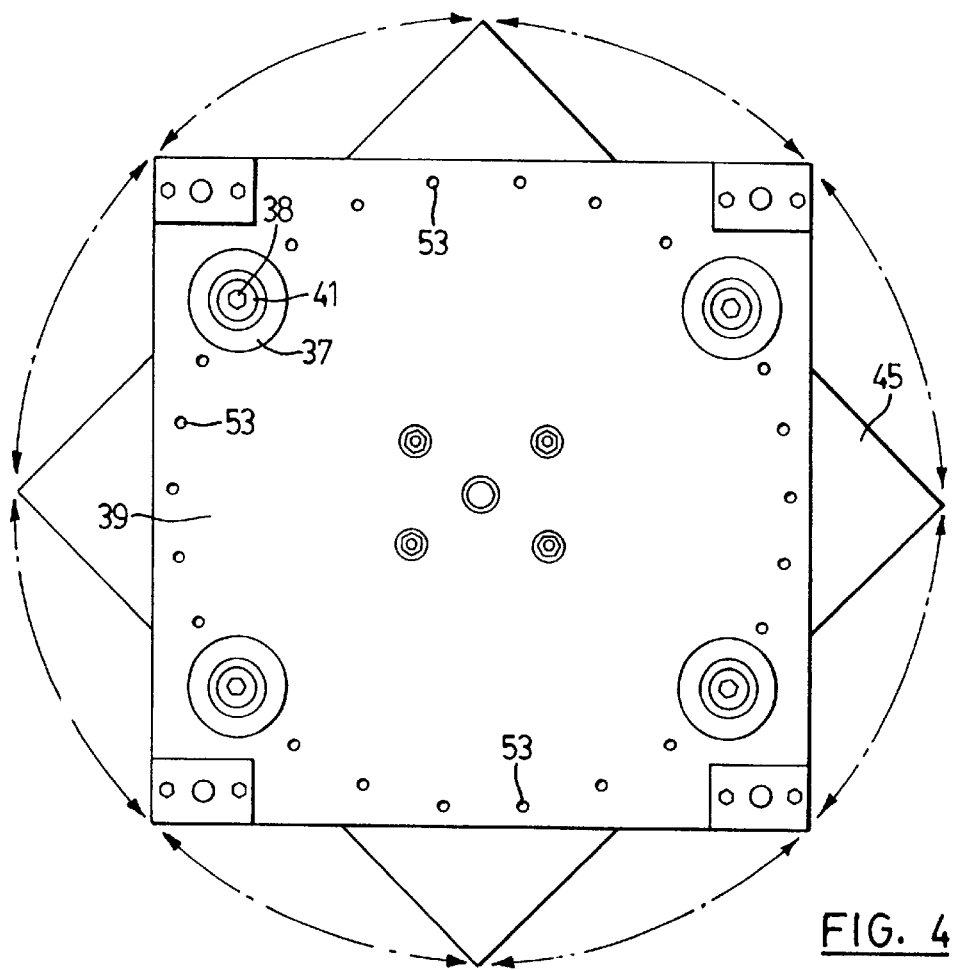
FIG. 4 is a plan view showing the rotatable connection of the top and bottom plates of the mounting assembly.

The milling device, here a saw 14 such as a chain saw, is suspended from the elevated track 12 by a mounting assembly 35. The mounting assembly 35 has rail engaging rollers 37 each of which is mounted on a shaft 38 fixed in a top plate 39 (FIG. 4). Preferably, each roller 37 is provided with a roller bearing 41. In the embodiment shown, four rollers 37 are mounted in the top plate 39 with two rollers 37 engaging the rail 16 and two rollers 37 engaging the rail 17, but the skilled person will appreciate that other arrangements may be better suited for use in association with different milling devices. Also, a frame or similar structure may be used instead of the plate 39 in some circumstances. In the present embodiment, the plate 39 is preferred to facilitate the desired orientation of the saw 14. Thus, the top plate 39 is attached to a bottom plate 45 by means of a shaft and roller bearing assembly 47 bolted to each plate 39 and 45. The roller bearing assembly 47 allows the bottom plate 45 to be rotated relative to the top plate 39. This rotational capability is facilitated by rollers 48 affixed to the bottom plate 45 and engaging the top plate 39. The rotational orientation of the top plate 39 to the bottom plate 45 may be fixed by means of a spring loaded rod 51 attached to the bottom plate 45 and being extendable through any of a plurality of holes 53 formed through the top plate 39 in a circular array (FIG. 2).

In the embodiment shown, the chain saw 14 is secured in a housing 56. Preferably, the housing 56 is a channel section of steel plate having a top portion 57 and a pair of depending side portions 58. The top of the housing 57 has a pair of saw blade pitch angle adjustment devices 59 attached to it in a linearly spaced arrangement. The pitch angle adjustment device 59 comprises a plate 61 having an arcuate slot 63 formed through it, and the plate 61 is affixed to the top of the housing 57. A support arm 65 is pivotally attached to the plate 61 at the centre of the circle defined by extending the arc of the slot 63 using a bolt 67 and locknut 68, for example. The arm 65 has a hole through it which registers with the arcuate slot 63 in the plate 61. The plate 61 is secured at the desired angle relative to the arm 65 by means of a cap screw 71 and nut 72.

While the track 12 may be positioned at a desired height and slope above the roof insulation layer, it is as a practical matter necessary to provide a means of fine vertical adjustment for the saw 14 itself. Thus, the embodiment shown is provided with a turnbuckle vertical adjustment means 75 extending upwardly from each support arm 65 and downwardly from the bottom plate 45. In the preferred embodiment, a threaded rod 77 is welded to and extends downwardly from an L-bracket 78 bolted to the bottom plate 45. Likewise, a threaded rod 79 is welded to and extends upwardly from the arm 65. A turnbuckle 81 engages both rods 77 and 79, thereby provided a means to adjust the vertical location of the saw 14 relative to the insulation layer of the roof.

The assembled milling apparatus 10 is situated above the insulation which requires levelling, sloping or in which a trough is to be cut. The track is set at the desired slope angle by adjusting the heights of the cross members 24 using the sleeves 26. A laser guide may conveniently be used to facilitate this slope adjustment. The saw 14 located near one end of the track 12 is vertically adjusted using the turnbuckle means 75 to provide the desired depth of milling into the insulation layer, and the angle of the blade relative to the longitudinal direction of the track 12 is set using the spring loaded rod 51. Where saw 14 is an electric powered chain saw or similar device, having a saw blade with a lower straight cutting edge of about 22 inches (56 cm), up to about 2 inches (5 cm) of material can be shaved off the insulation layer with each pass of the machine. This milling of the insulation is accomplished by pushing the activated saw 14 along the track 12, thereby removing a swath of insulation material from the upper surface of the installed layer. The length of the milling run can readily extend to 50 plus feet (15.25 m) using an apparatus 10 of the invention. Using cross members 24 having a length of about 66 inches (168 cm), two adjacent runs of the saw 14 along the insulation layer can be made per set up.

Troughs for drainage, for example, may also be cut into the insulation layer by orienting the saw blade of the saw 14 along the longitudinal direction of the track 12 and pitching the blade of the saw 14 at a desired angle using the pitch angle adjustment device 59 to make a first cut into the layer. After the first cut is made, the saw 14 is pitched at an opposing angle to the vertical, and a second cut is then made along the insulation to create a V-shaped trough.

From the foregoing description, the skilled person will appreciate that the apparatus 10 allows the roof to be manufactured with a longer expected useful life than otherwise would be the case. By means of the invention, the insulation layer of the roof can be provided with a planarly smooth surface so that the finished roof is devoid of low areas in which water may pool. Likewise, the apparatus 10 can be employed to provide a desired slope to the roof or portions of it, as well as to create low points for drainage purposes. Thus, a roof made using the apparatus of the invention will possess good drainage and will not have areas where water may pool. As the skilled person will appreciate, a roof from which water is properly drained will maintain its integrity for a significantly longer time than will a roof upon which water pools.

What is claimed is:

1. An apparatus for milling the surface of a low slope substrate, comprising:

a milling device;

a track along which the milling device may move, said track comprising a pair of parallel rails along which are spaced a plurality of rungs, said rails and said rungs forming a ladder structure;

a plurality of adjustable supports for the track, the supports having adjustment means for orienting the track horizontally or at a desired angle to horizontal above the substrate;

a mounting assembly for the milling device, the assembly having means for engaging the track and enabling movement of the assembly along the track, the milling device depending from the mounting assembly, the means for engaging the track comprising a plurality of rail engaging rollers mounted on a top plate of the mounting assembly; and adjustment means coacting with the milling device and the mounting assembly enabling the device to be oriented in a desired manner relative to the substrate;

wherein the mounting assembly comprises a bottom Plate rotatable attached to the top plate, and the top and bottom plates of the mounting assembly are rotatably attached to one another by a shaft and roller bearing assembly affixed centrally to each plate.

2. An apparatus as claimed in claim 1, wherein the rungs are tubular, each rung extending through each rail.

3. An apparatus as claimed in claim 1, wherein the means for engaging the track comprises four of said rail engaging rollers, each of which is mounted on a shaft fixed in the top plate of the mounting assembly, each of said rails being engaged by two said rail engaging rollers.

4. An apparatus as claimed in claim 1, further comprising a plurality of rollers affixed to the bottom plate and engaging the top plate.

5. An apparatus as claimed in claim 4, wherein the top plate has a plurality of holes through it in a circular array, and a spring loaded rod is attached to the bottom plate and is extendable through any of said holes in the top plate, thereby fixing a rotational orientation of the bottom plate relative to the top plate.

6. An apparatus as claimed in claim 5, wherein the milling device is a chain saw having upper and lower cutting portions.

7. An apparatus as claimed in claim 6, further comprising a housing attached to the chain saw, the housing is a channel section having a top portion and depending sides extending over the upper cutting portion of the saw.

8. An apparatus as claimed in claim 7, further comprising vertical adjustment means extending between the bottom plate of the mounting assembly and the top portion of the housing for the chain saw.

9. An apparatus as claimed in claim 8, wherein the vertical adjustment means comprises a pair of threaded rods extending downward from the lower plate, a pair of threaded rods extending upward from the top portion of the housing for the chain saw, and a turnbuckle engaging each pair of opposing threaded rods, so that rotation of the turnbuckle causes the engaged rods to move toward or away from one another.

10. An apparatus as claimed in claim 8, further comprising pitch angle adjustment means for the saw blade, said means being attached to the top portion of the housing for the chain saw.

11. An apparatus as claimed in claim 10, wherein the pitch angle adjustment means comprises a plate having an arcuate slot formed through it, the plate is affixed to the top portion of the housing and a support arm is pivotally attached to the plate at the centre of a circle defined by extending the arc of the slot, the arm has a hole through it which registers with the arcuate slot, and a threaded securement means is provided through the slot and hole to secure the plate relative to the arm at a desired angle.

12. An apparatus as claimed in claim 11, wherein the upward extending threaded rod of the vertical adjustment means is attached to the support arm of the pitch angle adjustment means.

* * * * *